(12) United States Patent
Johnson et al.

(10) Patent No.: US 10,649,640 B2
(45) Date of Patent: May 12, 2020

(54) PERSONALIZING PERCEIVABILITY SETTINGS OF GRAPHICAL USER INTERFACES OF COMPUTERS

(71) Applicant: Microsoft Technology Licensing, LLC, Redmond, WA (US)

(72) Inventors: Robert Bryce Johnson, Sammamish, WA (US); Rachel Shelva Nizhnikov, Seattle, WA (US); Brett Humphrey, Redmond, WA (US); Ryan Demopoulos, Carnation, WA (US); Kelly Marie Renner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 15/585,125

(22) Filed: May 2, 2017

(65) Prior Publication Data
US 2018/0321828 A1   Nov. 8, 2018

(51) Int. Cl.
*G06F 3/0481* (2013.01)
*G06F 3/0484* (2013.01)
*G06F 3/0488* (2013.01)

(52) U.S. Cl.
CPC ........ *G06F 3/04847* (2013.01); *G06F 3/0481* (2013.01); *G06F 3/0488* (2013.01); *G06F 2203/04804* (2013.01)

(58) Field of Classification Search
None
See application file for complete search history.

(56) References Cited

U.S. PATENT DOCUMENTS

| | | | |
|---|---|---|---|
| 4,694,286 | A | 9/1987 | Bergstedt |
| 5,883,627 | A | 3/1999 | Pleyer |
| 6,249,115 | B1 | 6/2001 | Yost et al. |
| 6,636,228 | B2 | 10/2003 | Morton et al. |
| 6,788,308 | B2 | 9/2004 | Reavy et al. |
| 6,809,741 | B1 | 10/2004 | Bates et al. |

(Continued)

FOREIGN PATENT DOCUMENTS

CN   1652197 A   8/2005

OTHER PUBLICATIONS

Mick Symons, How to use visual and color accessibility options on your Mac, iMore, Published: Oct. 9, 2016, pp. 1-35 (Year: 2016).*

(Continued)

*Primary Examiner* — Howard Cortes
(74) *Attorney, Agent, or Firm* — NovoTechIP International PLLC

(57) ABSTRACT

The perceivability of user interface elements of a graphical user interface can be defined as a selection along a range. At one end of the range, a combination of settings for the graphical user interface allows for a highly-detailed user interface; at another end of the range, a combination of settings provides a graphical user interface having the highest perceivability. The high perceivability may include high contrast, but also may provide other user interface settings to address accessibility issues for an end user. The combination of settings can include attributes affecting the background, transparency, borders and text legibility. The selected combination of settings either sets, overrides or limits values for these attributes of user interface elements during rendering.

20 Claims, 6 Drawing Sheets

| | Setting 1 lowest | Setting 2 default | Setting 3 higher | Setting 4 highest |
|---|---|---|---|---|
| Application Background (dark)-302 Application Background (light) | Dark grey / Light grey | Black / White | Black / White | Black / White |
| Opacity - 304 | 60% | 80% | 90% | 100% |
| Blur (blur radius) - 306 | 50 | 40 | 20 | 0 (no blur) |
| Control Border Thickness - 308 | 0 | 1 | 2 | 3 |
| Window Border Thickness - 310 | 0 | 1 | 2 | 4 |
| Window Border Shadow – 312 (greyscale and opacity) | Light grey 30% | Grey 50% | Dark Grey 70% | Black 90% |
| Scrollbar visible - 314 | On hover | On hover | Always On | Always On |
| Font Size – 316 | 100% | 110% | 120% | 140% |
| Font Weight -318 | 90% | 100% | 110% | 120% |
| Foreground vs. Background -320 Contrast ratio | 3:1 | 4.5:1 | 7:1 | 14:1 |

300

(56) References Cited

U.S. PATENT DOCUMENTS

| | | | |
|---|---|---|---|
| 6,873,337 B1 | 3/2005 | Fernandez et al. | |
| 6,986,107 B2 | 1/2006 | Hanggie et al. | |
| 7,145,571 B2 | 12/2006 | Jones et al. | |
| 7,184,056 B2 | 2/2007 | Brody et al. | |
| 7,209,150 B2 | 4/2007 | Lowles et al. | |
| 7,480,405 B2 | 1/2009 | Poynter | |
| 7,639,394 B2 | 12/2009 | Forbush et al. | |
| 7,873,916 B1 | 1/2011 | Chaudhri | |
| 8,144,979 B2 | 3/2012 | Kuo | |
| 8,520,149 B2 | 8/2013 | Allen et al. | |
| 8,984,428 B2 | 3/2015 | Matas et al. | |
| 9,147,378 B2 | 9/2015 | Shekey | |
| 9,159,144 B2 | 10/2015 | Cherna et al. | |
| 9,218,784 B2 | 12/2015 | Myers | |
| 9,292,912 B2 | 3/2016 | Lee et al. | |
| 9,313,218 B1* | 4/2016 | Savant | H04L 63/1416 |
| 9,460,230 B1 | 10/2016 | Stepanov et al. | |
| 2001/0045961 A1 | 11/2001 | Stoakley et al. | |
| 2002/0152255 A1* | 10/2002 | Smith, Jr. | H04M 3/42068 |
| | | | 718/102 |
| 2007/0091113 A1 | 4/2007 | Jones et al. | |
| 2007/0229531 A1 | 10/2007 | Park et al. | |
| 2008/0134061 A1* | 6/2008 | Banerjee | G06F 3/1423 |
| | | | 715/762 |
| 2009/0066680 A1 | 3/2009 | Rumreich | |
| 2011/0265002 A1 | 10/2011 | Hong et al. | |
| 2012/0127198 A1 | 5/2012 | Gundavarapu | |
| 2012/0216136 A1* | 8/2012 | Karstens | G06F 3/0481 |
| | | | 715/765 |
| 2014/0063071 A1* | 3/2014 | Leventhal | G06F 3/04812 |
| | | | 345/661 |
| 2015/0089419 A1 | 3/2015 | Hwang et al. | |
| 2015/0170606 A1 | 6/2015 | Jureidini et al. | |
| 2016/0378201 A1* | 12/2016 | Baughman | G06F 8/38 |
| | | | 345/173 |
| 2018/0165467 A1* | 6/2018 | Yablokov | G06F 21/629 |

OTHER PUBLICATIONS

Kelly Guimont, How to Instantly Invert Display Colors in OS X, Nov. 11, 2014, the mac Observer (Year: 2014).*

"International Search Report & Written Opinion Issued in PCT Application No. PCT/US2018/026773", dated Jun. 8, 2018, 12 Pages.

Purewal, Sarah Jacobsson, "Windows 10 Settings menu: The Ease of Access tab—CNET", Retrieved from https://www.cnet.com/how-to/windows-10-settings-menu-the-ease-of-access-tab/, May 31, 2016, 6 Pages.

"Online Pattern Generator—20+ Tools for Designers", http://1stwebdesigner.com/pattern-generator-online/, Published on: Mar. 24, 2016, 123 pages.

"Using the Primary Contrast Controls", https://documentation.apple.com/en/color/usermanual/index.html, Retrieved on: Nov. 8, 2016, 9 pages.

"iPhoto: Make advanced adjustments", https://supportapple.com/kb/PH21283?locale=en_US, Retrieved on: Nov. 8, 2016, 5 pages.

"Accessibility", https://web.archive.org/web/20160924084103/https:/material.google.com/usability/accessibility.html, Published on: Sep. 24, 2016, 36 pages.

"Guide for People who are Blind or Low Vision." last updated on Feb. 7, 2017, available through https://www.microsoft.com/en-us/download/details.aspx?id=54760.

"High-contrast mode". Last updated Jan. 11, 2017. Available from: https://msdn.microsoft.com/en-us/windows/compatibility/high-contrast-mode.

"Aero Style Classes, Parts, and States", 2017, available from: https://msdn.microsoft.com/en-us/library/ee453680(VS.85).aspx.

"Parts and States", 2017, available from https://msdn.microsoft.com/en-us/library/bb773210(v=VS.85).aspx.

* cited by examiner

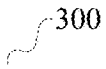

|  | Setting 1 lowest | Setting 2 default | Setting 3 higher | Setting 4 highest |
|---|---|---|---|---|
| Application Background (dark)-302<br>Application Background (light) | Dark grey /<br>Light grey | Black /<br>White | Black /<br>White | Black /<br>White |
| Opacity - 304 | 60% | 80% | 90% | 100% |
| Blur (blur radius) - 306 | 50 | 40 | 20 | 0 (no blur) |
| Control Border Thickness - 308 | 0 | 1 | 2 | 3 |
| Window Border Thickness - 310 | 0 | 1 | 2 | 4 |
| Window Border Shadow – 312<br>(greyscale and opacity) | Light grey<br>30% | Grey<br>50% | Dark Grey<br>70% | Black<br>90% |
| Scrollbar visible - 314 | On hover | On hover | Always On | Always On |
| Font Size – 316 | 100% | 110% | 120% | 140% |
| Font Weight -318 | 90% | 100% | 110% | 120% |
| Foreground vs. Background -320<br>Contrast ratio | 3:1 | 4.5:1 | 7:1 | 14:1 |

FIG.3

PERSONALIZING PERCEIVABILITY SETTINGS OF GRAPHICAL USER INTERFACES OF COMPUTERS

BACKGROUND

One of the challenges in providing a general-purpose computer for a consumer market is providing a graphical user interface that can meet the needs of diverse users. Such users may have different requirements due to, for example, environmental constraints, vision impairments, or cognitive disabilities.

One aspect of a graphical user interface is its color contrast. While many computers and other devices with a display allow color contrast to be adjusted, such adjustments generally are "global" in nature, i.e., the color contrast of the display may be adjusted.

In some operating systems and some applications, different display attributes can be associated with different user interface elements to provide for a desired combination of colors. For example, a browser application may allow a user to manipulate settings for font size, for colors for background, foreground, and text, and for borders of user interface elements. As another example, an operating system can provide such settings for use by all applications. The combination of settings for a group of attributes may be called a theme or visual style or palette. In some operating systems and in some applications, one or more predetermined combinations of settings may be available. For example, one combination of settings may provide highest contrast. Another combination of settings may address a visual impairment.

SUMMARY

This Summary is provided to introduce a selection of concepts in a simplified form that are further described below in the Detailed Description. This Summary is intended neither to identify key or essential features, nor to limit the scope, of the claimed subject matter.

An operating system of a computer is programmed to provide a graphical user interface through which the perceivability of user interface elements can be defined as a selection along a range. At one end of the range, a combination of settings for the graphical user interface allows for a highly-detailed user interface; at another end of the range, a combination of settings provides a graphical user interface having the highest perceivability. The high perceivability may include high contrast, but also may provide other user interface settings to address accessibility issues for an end user.

For at least three different points along the range, a different combination of settings is associated with each different point along the range. The combination of settings includes a setting for each of a plurality of attributes associated with user interface elements. Such attributes relate to characteristics of user interface elements such as background, borders, transparency (whether image data in a layer beneath a user interface element is visible through the user interface element), and text legibility. Yet other attributes can be related to animation, sound and/or aural an enhancements and other user interface outputs. For example, an attribute related to the background of an application is the background colors in either a light mode or dark mode. Attributes related to borders include border thickness, border color, border shadow, and scrollbar visibility. Attributes related to transparency include opacity and blur. Attributes related to text visibility include foreground color and background color contrast ratio, font size and font weight.

Given a selected point along the range, the operating system uses a corresponding combination of settings to either set, override or limit attributes of elements of the graphical user interface of the operating system and of each application running on the computer. By having a perceivability setting available within the operating system, developers can more easily define graphical user interfaces for the operating system and for applications that can comply with end users' needs for either desired perceivability of the graphical user interface or accessibility requirements.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

BRIEF DESCRIPTION OF THE DRAWINGS

FIG. 3 is an illustrative example of a data structure for a combination of settings for a perceivability setting.

DETAILED DESCRIPTION

Figure 1:
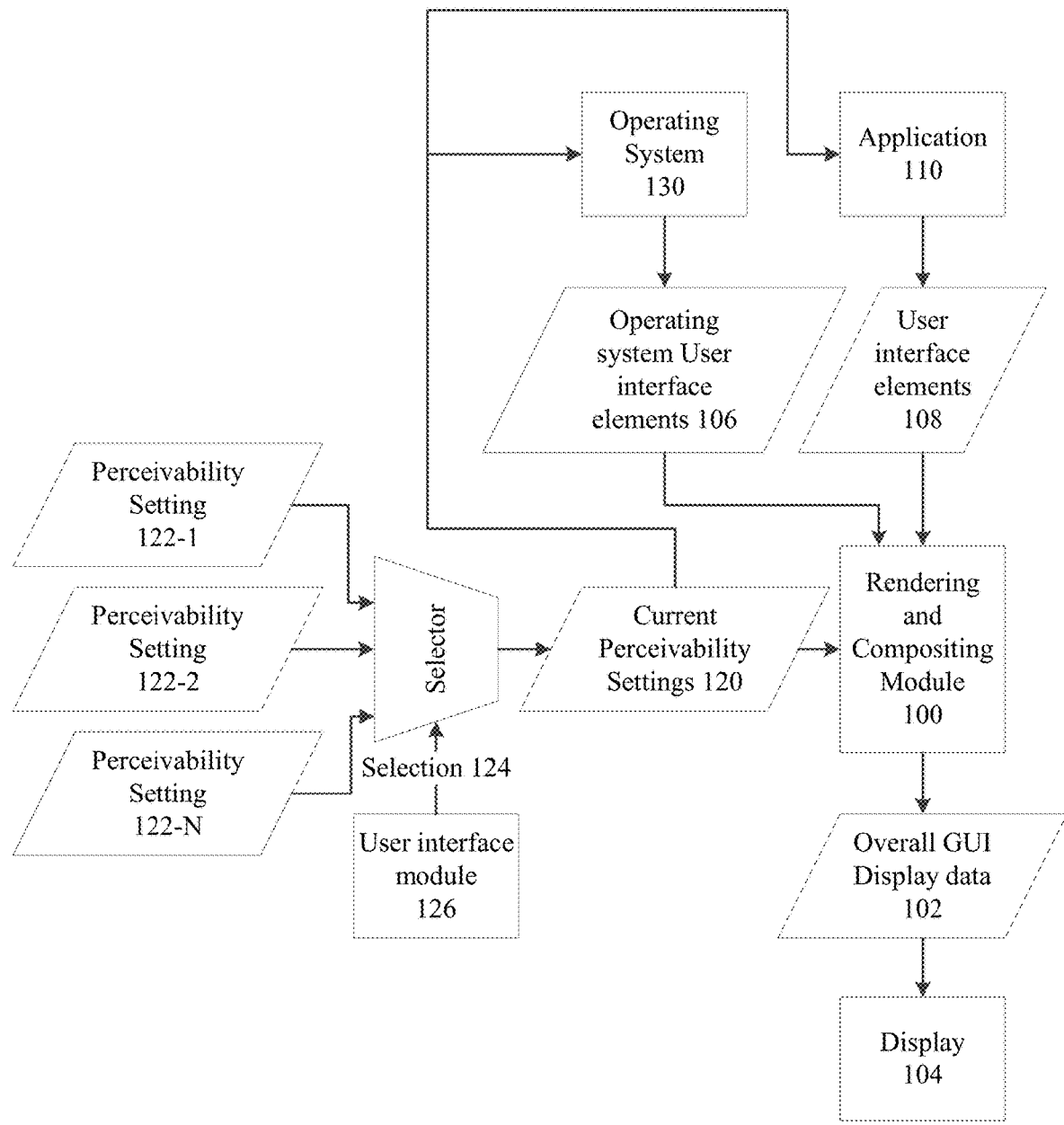
FIG. 1 is a data flow diagram of an illustrative example of how an operating system can generate a graphical user interface on a computer.

FIG. 1 is a data flow diagram of an illustrative example of how an operating system can generate a graphical user interface on a computer.

In a general-purpose computer, such as described below in more detail in connection with FIG. 6, a rendering and compositing module 100 runs on the computer and is used to generate the display data 102 for the overall graphical user interface (GUI) for the computer. The rendering and compositing module 100 may be part of an operating system 130 for the computer but is illustrated separately in FIG. 1. The display data 102 output by the rendering and compositing module 100 is displayed on a display 104.

This rendering and compositing module 100 receives data 106 describing user interface elements of the operating system 130 and data 108 describing user interface elements from an application 110 running on the computer. There may be multiple applications 110 providing different data for different user interface elements to be displayed. The module 100 renders the data 106 and 108 describing the user interface elements and combines the rendered elements into the display data 102. In some implementations, the operating system and/or the application(s) also may perform rendering of their own user interface elements, and these rendered elements.

The rendering of the user interface elements is performed by the operating system 130, application 110 and/or rendering and compositing module 100 in part, as described in detail below in connection with FIG. 5, using current perceivability settings 120. The perceivability settings may set, override or limit attributes of user interface elements to be rendered.

The current perceivability settings is a combination of settings or values for attributes used in rendering user interface elements. The combination of settings includes a setting for each of a plurality of attributes associated with user interface elements. Such attributes relate to characteristics of user interface elements such as backgrounds, borders, transparency (whether image data in a layer beneath a user interface element is visible through the user interface element), and text legibility. Yet other attributes can be related to animation, sound and/or aural an enhancements and other user interface outputs. For example, an attribute related to the background of an application is the background colors in either a light mode or dark mode. Attributes related to borders include border thickness, border color, border shadow, and scrollbar visibility. Attributes related to transparency include opacity and blur. Attributes related to text visibility include foreground color and background color contrast ratio, font size and font weight.

An example data structure for storing data representing the perceivability settings 120 (and candidate perceivability settings 122-1, 122-2, ..., 122-N, described below) is described in more detail below in connection with FIG. 3.

The current perceivability settings 120 is selected from among a set of candidate perceivability settings 122-1, 122-2, ..., 122-N, where N is an integer and is three or more. A selection 124 can be made by an end user through a user interface module 126. In response to the selection 124 received through the user interface module 126, a selector 128 establishes the current perceivability settings 120. An example user interface for the user interface module 126 is described in more detail below in connection with FIG. 4. The user interface module 126 defines the perceivability of user interface elements as a selection along a range. At one end of the range, a corresponding perceivability setting allows for a highly-detailed user interface; at another end of the range, a corresponding perceivability setting results in a graphical user interface having the highest perceivability. The high perceivability may include high contrast, but also may provide other user interface settings to address accessibility issues for an end user. For at least three different points along this range, a different combination of settings, or candidate perceivability setting, is associated with each different point along the range. The user interface module can provide for a selection among three, four, five or more perceivability settings along the range.

In the example shown in FIG. 1, both operating system user interface elements and application user interface elements are combined into the graphical user interface. In some implementations, only the graphical user interface of one application or of the operating system is shown at any given time and the user interface elements are not combined. In such implementations, an application 110 may access the perceivability settings 120 to render and display the graphical user interface, or an operating system 130 can render user interface elements of the operating system and/or of an application according to the perceivability settings 120. In some implementations, an application can provide a capability to select among candidate perceivability settings as described herein.

Figure 2A:
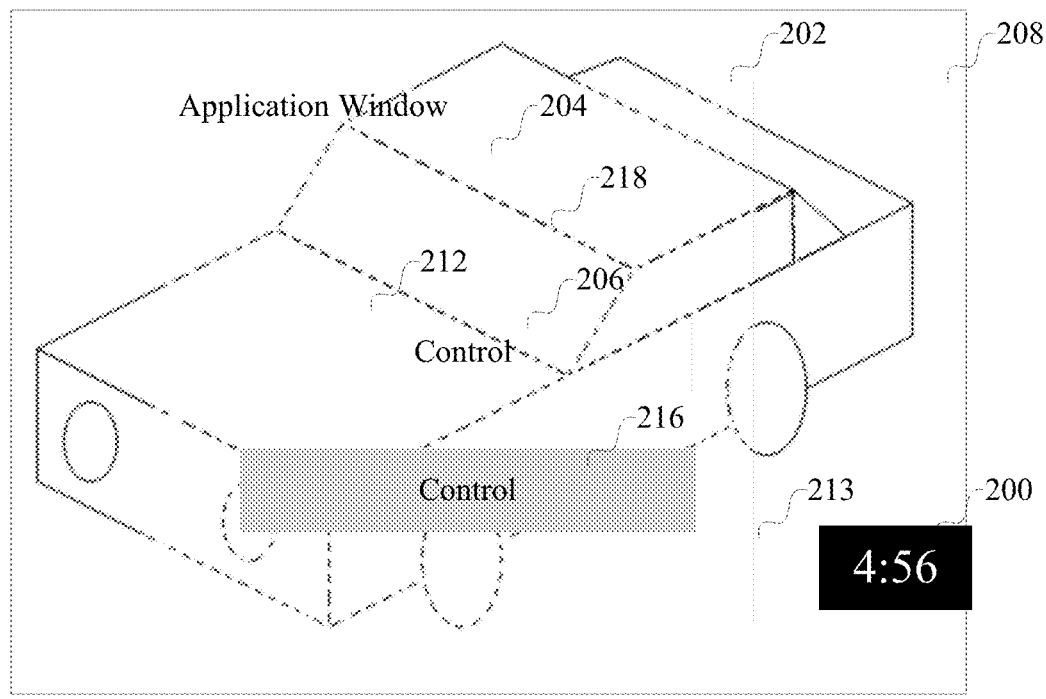
FIGS. 2A and 2B are an example graphical user interface for an application with two different perceivability settings.
Figure 2B:
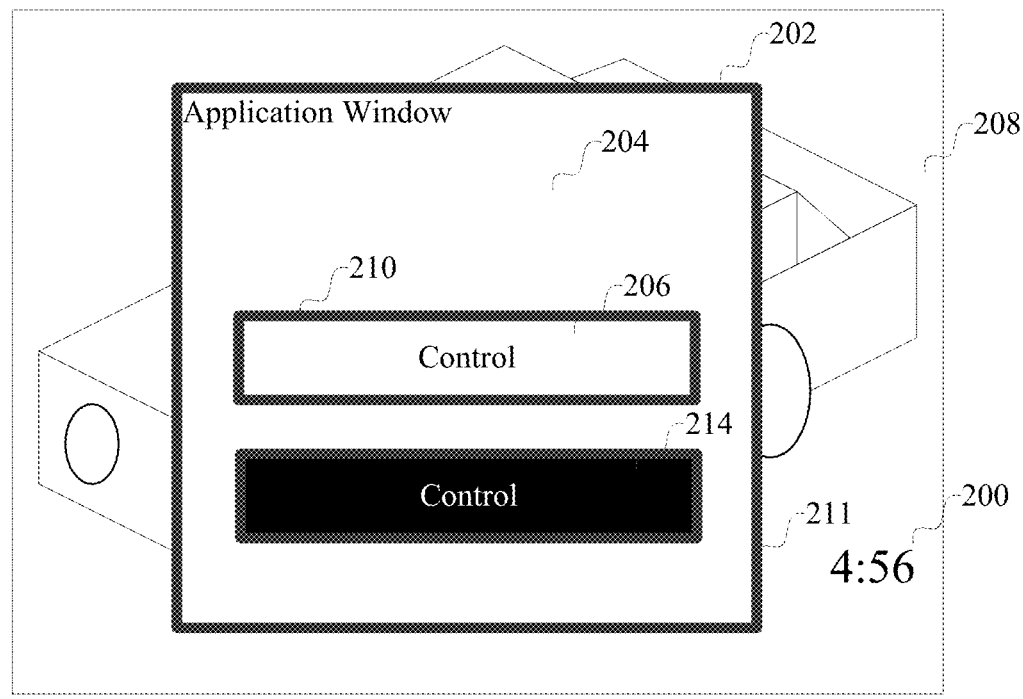

Turning now to FIGS. 2A and 2B, example graphical user interfaces are shown. In this example, in both Figures, an operating system provides operating system user interface elements, such as for a desktop on which windows for applications are placed. Example operating system user interface elements include a clock 200 and a background or wallpaper 208 or icons (not shown). Both Figures also show an application which provides application user interface elements at 202, such as a window 204 and control elements, e.g., 206. The window 204 may have its own background color or image (not shown).

Individual elements in FIG. 2A are rendered using different attributes than the attributes used to render those individual elements in FIG. 2B. For example, in FIG. 2B, borders 210, 211 of a control element 206 and window 204 are more visible, i.e., thicker and with a more pronounced shadow, than in FIG. 2A; the control element 206 and window 204 as shown in FIG. 2A does not have a highly-visible border 212, 213, i.e., thinner and with a less pronounced shadow. Likewise, a selected element 214 in FIG. 2B is strongly highlighted, whereas that element as shown in FIG. 2A at 216 is lightly highlighted. Also, the user interface in FIG. 2A is not entirely opaque, so an image in a layer (e.g., the desktop) beneath the application user interface is visible (a car is shown in dashed lines at 218 in FIG. 2A). The foreground elements are completely opaque in FIG. 2B and thus this image in the layer beneath the application user interface is not visible with the perceivability settings used to render FIG. 2B. Because of these differences, the user interface as rendered in FIG. 2B is generally more perceivable than the user interface as rendered in FIG. 2A; likewise, the user interface as rendered in FIG. 2A is generally less perceivable but more detailed than the user interface as rendered in FIG. 2B.

The perceivability settings are sets of values for attributes associated with the presentation of user interface elements. Such attributes relate to characteristics of user interface elements such as backgrounds, borders, transparency (whether image data in a layer beneath a user interface element is visible through the user interface element), and text legibility. Yet other attributes can be related to animation, sound and/or aural an enhancements and other user interface outputs. For example, an attribute related to the background of an application is the background colors in either a light mode or dark mode. Attributes related to borders include border thickness, border color, border shadow, and scrollbar visibility. Attributes related to transparency include opacity and blur. Attributes related to text visibility include foreground color and background color contrast ratio, font size and font weight.

In this example implementation, the operating system can provide a set of candidate perceivability settings which are designed to provide different levels of perceivability over a range of possible levels. Each set of candidate perceivability settings can be represented by a data structure representing attributes and values for those attributes which provides the combination of settings for rendering user interface elements.

An example data structure for storing data representing the perceivability settings will now be described in more detail in connection with FIG. 3. The data illustrated in FIG. 3 can be stored in a variety of formats. For example, a data file storing key-value pairs can be used to represent each candidate set of perceivability settings. As another example, the set of values for a candidate set of perceivability settings can be stored in a known format. The actual form of the data structure used depends on how the computer program of the operating system is written. The data structure can take different forms depending on its use, such as for storage in a persistent data file, or stored in memory during processing by a rendering module.

As shown in FIG. 3, values for attributes can be stored in perceivability settings 300. For example, the settings can include a background color 302 for the application, on which other user interface elements for the application are placed, for each of a "dark" mode and "light" mode for the application. The settings can include attributes related to transparency include opacity 304 (a percentage where 100% is opaque) and blur 306 (defined a blur radius for a blur filter where 0 is no blur). Opacity 308 relates to whether image data in another layer beneath a user interface element is visible through the user interface element. For example, for high perceivability, the user interface for an application may be completely opaque so that layers beneath that user interface are not visible.

Attributes for rendering borders of user interface elements also can be provided. For example, controls are user interface elements within the user interface for an application which an end user can manipulated, such as buttons and the like. The border thickness (308) for such controls can be stored. The border thickness (310) for the user interface of the application, e.g., its "window", can be separately controlled. Any shadow for the window border also can be controlled by setting values for the attributes of that shadow. The greyscale and opacity, for example, of that shadow can be stored as indicated at 312. Another aspect of a border can be whether any scrollbar is visible (314). In some user interfaces, a scroll bar generally can remain hidden but can be visible when a user "hovers" a cursor controlled by a pointing device, or when the user performs some other specified input gesture. Making the scrollbar always visible, on the other hand, makes the user interface generally more perceivable.

Additional attributes for rendering text also can be provided. For example, attributes such as font size 316 and font weight 318 can be stored. The contrast ratio 320 of the foreground color to the background color also can be stored. Generally, font size, font weight and contrast are increased to make text more visible.

Other attributes not shown in FIG. 3 also can be included in the perceivability settings.

For example, text spacing (whether between words or between lines) generally is increased to make text more visible. Font type can be changed based on characteristics of the font (e.g., serif vs. non-serif) or other judgment about which font types are more visible.

As another example, in most cases, the size of an element is defined by the application. In some instances, values used for attributes of text or other elements contained within an element may affect the size of the element. In some perceivability settings, the size of an element can be changed to make the size of any text the element contains.

Another aspect of perceivability can relate to accessibility needs, or environment, of an end user. For example, a visually impaired user also may benefit from sonic or aural enhancements. Depending on the environment, other output from an application, such as lights, sounds, vibrations or haptic feedback, can be generated and presented to the user through an appropriate output device.

As shown in FIG. 3 by way of a table, different combinations of values for these perceivability settings are provided, by way of example, as different candidate perceivability settings. In one implementation, each combination can be assigned a value along a range (e.g., "1", "2", "3", and "4"), such that the set of combinations is organized along this range by order of perceivability. The range represents a range of perceivability from less perceivability ("1") to more perceivability ("4"), and the different combinations of values as ordered along this range provide perceivability settings to implement this range of perceivability. In another implementation, each attribute can be represented by a function which maps a given value along the range to a value for that attribute, which provides, given a set of attributes, a set of values for a perceivability setting corresponding to the given value along the range. Notably, the values for each attribute are monotonically non-increasing, or non-decreasing, as the case may be, over the range of perceivability settings, and the value for at least one attribute changes between perceivability settings, so as to provide perceivability settings that range from less perceivable to more perceivable.

Figure 4:
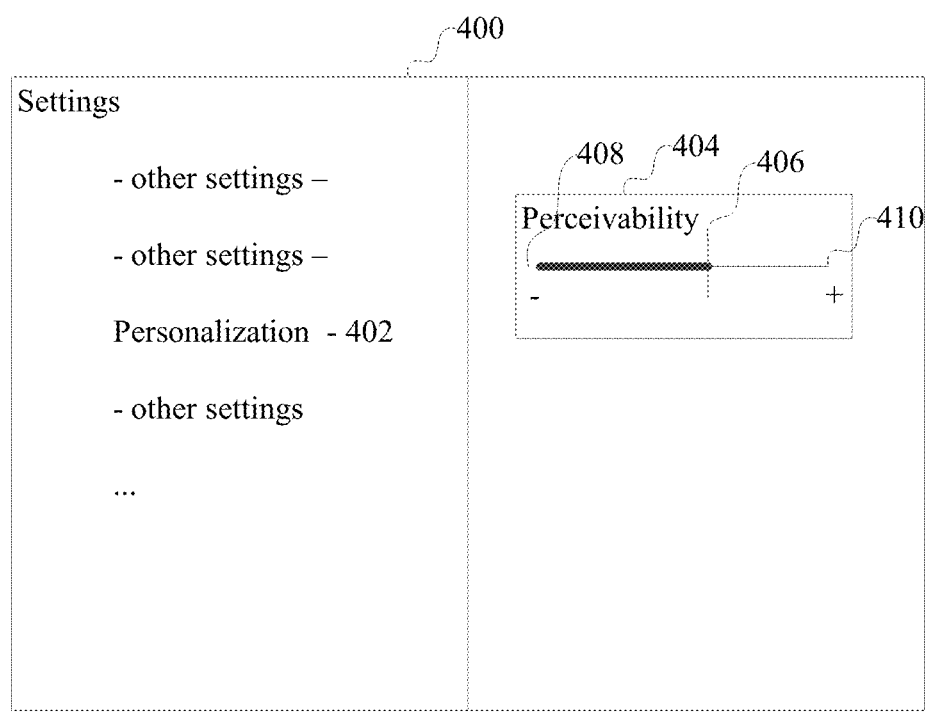
FIG. 4 is an illustrative example of a graphical user interface element for setting a perceivability setting.

Turning now to FIG. 4, an example graphical user interface through which a user can select a perceivability setting will now be described. In this example user interface, a simple slider 404 can be used to represent a range of values representing perceivability. The slider can have indication of a current setting 406 which is mapped to a current value. The slider has a possible range of user-selectable settings from a low end as indicated at 408 to a high end as indicated 410. In response to user manipulation of the current setting 406 of the slider, a value is determined for the perceivability setting. In response to the selection of the value, a corresponding combination of settings is selected as the perceivability settings. It should be understood that FIG. 4 is merely an example user interface for setting the perceivability setting. Any other user interface element that allows a user to select a value along a range of candidate values, such as a dial, radio buttons, menu, etc., can be used.

In addition to a user selection along the range, environmental factors sensed by the computer also can be used to select the perceivability settings. For example, a light sensor can be used to adjust the perceivability settings based on the ambient brightness in the environment in which the computer is being used. The time of day also can be used to adjust the perceivability settings to adjust color of light emitted by the display according to the time of day. Data from such sensors can be mapped to a perceivability setting.

Figure 5:
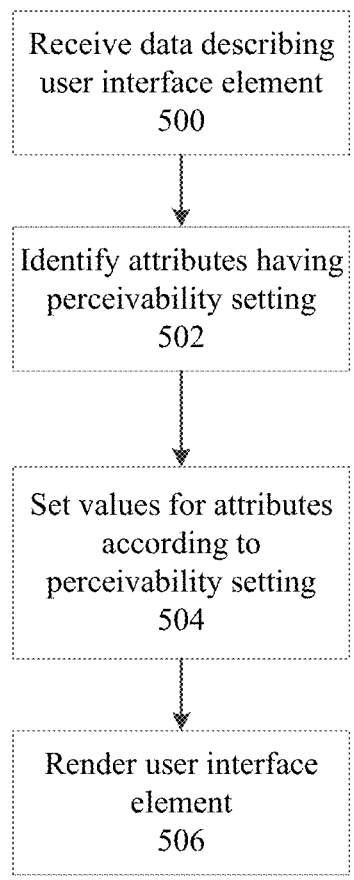
FIG. 5 is a flow chart describing an example operation for generating a rendering of a graphical user interface.

Turning now to FIG. 5, a flowchart of an example operation for generating a rendering of a graphical user interface will now be described.

In this example, an application has user interface elements which are implemented using data structures derived from operating system supported data structures for user interface elements. Such data structures are commonly called user interface primitives in a user interface framework provided by a platform (operating system and computer hardware) for which an application is developed and on which the application runs. Such user interface primitives generally have attributes for which values can be set to determine the appearance of a user interface element when rendered and displayed. By using such primitives, the operating system can store values that can provide default values for, or otherwise override values or limit values provided by the application for, these attributes. The perceivability settings can provide values for some of these attributes.

Thus, in FIG. 5, a rendering module (e.g. 100 in FIG. 1) receives 500 data describing a user interface element. Attributes of the user interface element for which there are perceivability settings are identified 502. Values for these attributes are set 504 according to the perceivability settings, for example by providing default values, limiting values or overriding values for these attributes. The user interface element is then rendered 506 according to the values set for these attributes.

Accordingly, in one aspect, a computer system comprises a processing system including at least one processing unit and memory configured by computer programs including an application and an operating system. The application includes a graphical user interface object having an attribute affecting perceivability of the graphical user interface object when rendered and displayed with a value for the attribute. The operating system includes perceivability settings controlling display of graphical user interfaces, including a value for the attribute of the graphical user interface object. The perceivability settings are selected based on a range of perceivability from among a set of different perceivability settings corresponding to different levels of perceivability. The processing system is operative to render the graphical user interface object using a value for the attribute as set by the perceivability settings. Another aspect is a method performed by such a computer system.

In another aspect, a computer implemented process is performed by a computer comprising a processing system including at least one processing unit and memory configured by computer programs including an application and an operating system. The application includes a graphical user interface object having an attribute affecting perceivability of the graphical user interface object when rendered and displayed with a value for the attribute. The process includes establishing in memory of the computer perceivability settings controlling display of graphical user interfaces, including a value for the attribute of the graphical user interface object. The perceivability settings are selected based on a range of perceivability from among a set of different perceivability settings corresponding to different levels of perceivability. The graphical user interface object of the application is rendered according to the selected perceivability settings.

In another aspect, a computer includes means for storing perceivability settings controlling display of graphical user interfaces, including values for attributes of graphical user interface objects, and means for selecting a perceivability setting based on a range of perceivability from among a set of different perceivability settings corresponding to different levels of perceivability, and means for rendering the graphical user interface objects according to the values for the attributes set by the selected perceivability settings.

In any of the foregoing aspects, the perceivability setting can be a combination of settings or values for attributes used in rendering user interface elements. The combination of settings includes a setting for each of a plurality of attributes associated with user interface elements. Such attributes relate to characteristics of user interface elements can include at least a value for opacity of the graphical user interface object. The perceivability setting can include any one or more of the following attributes of a user interface object: backgrounds, borders, transparency (whether image data in a layer beneath a user interface element is visible through the user interface element), and text legibility. Yet other attributes can be related to animation, sound and/or aural an enhancements and other user interface outputs. For example, an attribute related to the background of an application can be the background colors in either a light mode or dark mode. Attributes related to borders can include border thickness, border color, border shadow, and scrollbar visibility. Attributes related to transparency can include opacity and blur. Attributes related to text visibility can include foreground color and background color contrast ratio, font size and font weight.

In any of the foregoing aspects, the processing system can be operative to receive an input indicating a value along the range of perceivability and selects the perceivability settings according to the received value.

In any of the foregoing aspects, the operating system can be operative to select the perceivability settings further based on data sensed from an environment in which the computer system is being used.

In any of the foregoing aspects, the perceivability settings further can include sounds to be generated for the user interface.

In any of the foregoing aspects, the perceivability settings further include settings that cause the user interface element to be less perceivable when rendered.

In any of the foregoing aspects, the operating system can be operative to, in response to a request from the application to render the graphical user interface object, compare a value for the attribute of the graphical user interface object to the value in the perceivability settings to determine if the value for the attribute conforms to the perceivability setting. In response to a determination that the value for the attribute does conform to the perceivability setting, the operating system can render the graphical user interface object according to the value for the attribute. In response to a determination that the value for the attribute does not conform to the perceivability setting, the operating system can render the graphical user interface object according to a value for the attribute which conforms to the perceivability setting.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Figure 6:
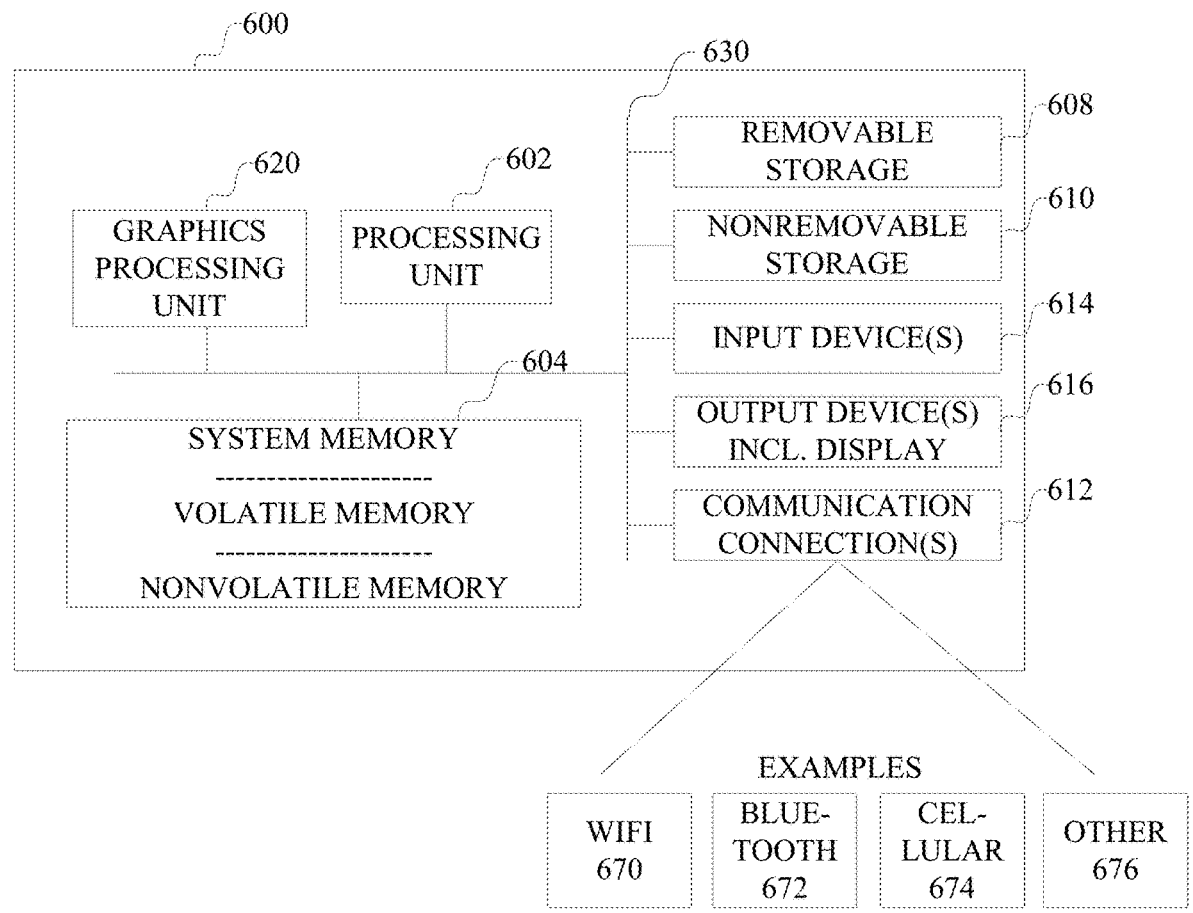
FIG. 6 is a block diagram of an example computer in which components of such a system can be implemented.

Having now described an example implementation, FIG. 6 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 6, a computer 600 includes a processing system comprising at least one processing unit 602 and at least one memory 604. The processing unit 602 can include multiple processing devices; the memory 604 can include multiple memory devices. A processing unit 602 comprises a processor which is logic circuitry which responds to and processes instructions to provide the functions of the computer. A processor can include one or more processing cores (not shown) that are multiple processors within the same logic circuitry that can operate independently of each other. Generally, one of the processing units in the computer is designated as a primary processor, typically called the central processing unit (CPU). One or more additional co-processing units 620, such as a graphics processing unit (GPU) or other logic devices, also can be present in the computer. A co-processing unit comprises a processor or other logic device that performs operations that supplement the central processing unit, such as but not limited to graphics operations and signal processing operations. Such co-processing units or other logic device may be located within some of the other components of the computer.

The memory 604 may include volatile computer storage devices (such as dynamic random access memory (DRAM) or other random access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 600 can include additional computer storage devices (whether removable or non-removable) such as, but not limited to, magnetically-recorded or optically-recorded disks or tape. Such additional computer storage devices are illustrated in FIG. 6 by removable storage device 608 and non-removable storage device 610. Such computer storage devices 608 and 610 typically are nonvolatile storage devices. The various components in FIG. 6 are generally interconnected by an interconnection mechanism, such as one or more buses 630.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 604, removable storage 508 and non-removable storage 610 are all examples of computer storage devices. Some examples of computer storage devices are RAM, ROM, EEPROM, flash memory, processor registers, or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 600 also may include communications connection(s) 612 that allow the computer to communicate with other devices over a communication medium. Communication media transmit data, such as computer program instructions, data structures, program modules or other data, over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

In a computer, example communications connections include, but are not limited to, a wireless communication interface for wireless connection to a computer network, and one or more radio transmitters for telephonic communications, such as over cellular telephone networks. For example, communications connections 612 are devices, such as a wired network interface, wireless network interface, radio frequency transceiver, e.g., Wi-Fi 670, cellular 674, long term evolution (LTE) or Bluetooth 672, etc., transceivers, navigation transceivers, e.g., global positioning system (GPS) or Global Navigation Satellite System (GLONASS), etc., transceivers, and network interface devices 676, e.g., Ethernet, etc., or other device, that interface with communication media to transmit data over and receive data from signal propagated over the communication media. Such connections support communication with other devices. One or more processes may be running on the computer and managed by the operating system to enable voice or data communications over such connections.

The computer 600 may have various human and machine input device(s) 614 such as a pointer device, keyboard, touch-based input device, pen, camera, microphone, sensors, such as accelerometers, gyroscopes, thermometers, light sensors and the like, and so on. The computer 1200 may have various output device(s) 616 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 608 and 610, communication connections 612, output devices 616 and input devices 614 can be integrated within a housing with the rest of the computer, or can be connected through various input/output interface devices on the computer, in which case the reference numbers 608, 610, 612, 614 and 616 can indicate either the interface for connection to a device or the device itself.

A computer generally includes an operating system, which is a computer program that, when executed, manages access, by other applications running on the computer, to the various resources of the computer. There may be multiple applications. The various resources include the memory, storage, input devices and output devices, such as display devices and input devices as shown in FIG. 1. To manage access to data stored in nonvolatile computer storage devices, the computer also generally includes a file system which maintains files of data. A file is a named logical construct which is defined and implemented by the file system to map a name, and a sequence of logical records of data to the addressable physical locations on the computer storage device. Thus, the file system hides the physical locations of data from applications running on the computer, allowing applications to access data in a file using the name of the file and commands defined by the file system. A file system generally provides at least basic file operations such as creating a file, opening a file, writing a file or its attributes, reading a file or its attributes, and closing a file.

The various modules, tools, or applications, and data structures and flowcharts of FIGS. 1-5, as well as any operating system, file system and applications on a computer in FIG. 6, can be implemented using one or more processing units of one or more computers with one or more computer programs processed by the one or more processing units.

A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures. Such components and modules have inputs and outputs through locations in memory or processor registers from which data in such data structures can be read and to which data in such data structures can be written when the component or module is executed by the computer.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A computer system, comprising:
a processing system including at least one processing unit and memory configured by computer programs including an application and an operating system,
wherein the application includes a graphical user interface object having a plurality of attributes affecting perceivability of the graphical user interface object when rendered and displayed with values for the plurality of attributes, each of the plurality of attributes being related to a characteristic of the graphical user interface object;
wherein the operating system includes a set of different perceivability settings controlling display of the graphical user interfaces object, each perceivability setting including values for the plurality of attributes of the graphical user interface object and each perceivability setting corresponding to a different level of perceivability;
wherein a perceivability settings from the set of different perceivability settings is selected based on a range of perceivability provided from among the set of different perceivability settings by using a slider control;
wherein the processing system is operative to render the graphical user interface object using values for the attributes as set by the perceivability settings.

2. The computer system of claim 1, wherein the set of different perceivability settings includes at least a value for opacity applied to the graphical user interface object.

3. The computer system of claim 1, wherein the processing system is operative to receive an input indicating a value along the range of perceivability and to select the perceivability setting according to the received value.

4. The computer system of claim 3, wherein the processing system is operative to select the perceivability setting further based on data sensed from an environment in which the computer system is being used.

5. The computer system of claim 1, wherein the set of different perceivability settings further includes sounds to be generated for the user interface.

6. The computer system of claim 1, wherein the set of different perceivability settings further includes settings that cause the user interface object to be less perceivable when rendered.

7. The computer system of claim 1, wherein when the application is executed by the processing system, the operating system is operative to, in response to a request to render the graphical user interface object:
compare a value for the attribute of the graphical user interface object to the value in the perceivability setting to determine if the value for the attribute conforms to the perceivability setting;
in response to a determination that the value for the attribute does conform to the perceivability setting, render the graphical user interface object according to the value for the attribute; and
in response to a determination that the value for the attribute does not conform to the perceivability setting, render the graphical user interface object according to a value for the attribute which conforms to the perceivability setting.

8. A computer implemented process performed by a computer, the computer comprising:
a processing system including a processing unit, and memory configured by computer programs including an application and an operating system,
wherein the application includes a graphical user interface object having attributes affecting perceivability of the graphical user interface object when rendered and displayed with values for the attributes, the attributes being related to one or more characteristics of the graphical user interface object,
wherein the process comprises:
establishing in memory of the computer a set of different perceivability settings controlling display of the graphical user interfaces, each perceivability setting including values for the attributes of the graphical user interface object, and each perceivability setting corresponding to a different level of perceivability, wherein a perceivability setting is selected based on a range of perceivability provided from among the set of different perceivability settings by using a slider control; and
rendering the graphical user interface object of the application according to the selected perceivability setting.

9. The computer implemented process of claim 8, wherein the set of different perceivability settings includes at least a value for opacity applied to an image in the graphical user interface.

10. The computer implemented process of claim 8, further comprising:
  receiving an input indicating a value along the range of perceivability; and
  selecting the perceivability setting according to the received value.

11. The computer implemented process of claim 10, wherein selecting the perceivability setting is further based on data sensed from an environment in which the computer system is being used.

12. The computer implemented process of claim 8, wherein the set of different perceivability settings further includes sounds to be generated for the user interface.

13. The computer implemented process of claim 8, wherein the set of different perceivability settings further includes settings that cause the user interface object to be less perceivable when rendered.

14. The computer implemented process of claim 8, further comprising, in response to a request to render the graphical user interface object:
  comparing a value for the attribute of the graphical user interface object to the value in the perceivability setting to determine if the value for the attribute conforms to the perceivability setting;
  in response to a determination that the value for the attribute does conform to the perceivability setting, rendering the graphical user interface object according to the value for the attribute; and
  in response to a determination that the value for the attribute does not conform to the perceivability setting, rendering the graphical user interface object according to a value for the attribute which conforms to the perceivability setting.

15. A computer program product comprising:
  a computer storage device storing computer program instructions that, when processed by a computer comprising a processing unit and memory configured by the computer program instructions causes the computer to perform a process comprising:
    establishing, in the memory of the computer, a set of different perceivability settings controlling display of graphical user interfaces, the graphical user interfaces including a graphical user interface object of an application, the graphical user interface object having a plurality of attributes affecting perceivability of the graphical user interface object when rendered and displayed with values for the plurality of attributes, each of the plurality of attributes being related to a characteristic of the graphical user interface object; and
    rendering the graphical user interface object of the application according to a selected perceivability setting,
  wherein:
    the each perceivability settings includes values for the attributes of the graphical user interface object, each perceivability setting corresponds to a different level of perceivability, and a perceivability setting is are selected based on a range of perceivability provided from among the set of different perceivability settings by using a slider control.

16. The computer program product of claim 15, wherein the set of different perceivability settings includes at least a value for opacity applied to an image in the graphical user interface.

17. The computer program product of claim 15, wherein the process performed by the computer further comprises:
  receiving an input indicating a value along the range of perceivability; and
  selecting the perceivability setting according to the received value.

18. The computer program product of claim 17, wherein selecting the perceivability settings is further based on data sensed from an environment in which the computer system is being used.

19. The computer program product of claim 15, wherein the set of different perceivability settings further includes sounds to be generated for the user interface.

20. The computer program product of claim 15, wherein the set of different perceivability settings further includes settings that cause the user interface element object to be less perceivable when rendered.

* * * * *